US012412710B2

(12) United States Patent
Fujita et al.

(10) Patent No.: US 12,412,710 B2
(45) Date of Patent: Sep. 9, 2025

(54) LEAD FRAME AND MANUFACTURING METHOD OF LEAD FRAME INSERT MOLDED ARTICLE

(71) Applicant: OMRON Corporation, Kyoto (JP)

(72) Inventors: Hiroyuki Fujita, Kyoto (JP); Kenji Shinohara, Kyoto (JP); Hiroto Yonehara, Kyoto (JP)

(73) Assignee: OMRON Corporation, Kyoto (JP)

( * ) Notice: Subject to any disclaimer, the term of this patent is extended or adjusted under 35 U.S.C. 154(b) by 212 days.

(21) Appl. No.: 18/448,981

(22) Filed: Aug. 14, 2023

(65) Prior Publication Data

US 2024/0105402 A1 Mar. 28, 2024

(30) Foreign Application Priority Data

Sep. 28, 2022 (JP) ................................ 2022-154443

(51) Int. Cl.

*H01H 13/14* (2006.01)
*H01H 11/00* (2006.01)
*H01H 13/04* (2006.01)

(52) U.S. Cl.

CPC ........ *H01H 13/14* (2013.01); *H01H 11/0056* (2013.01); *H01H 13/04* (2013.01); *H01H 2229/048* (2013.01)

(58) Field of Classification Search

CPC ....... H01H 2001/58; H01H 2001/5888; H01H 2003/00; H01H 2003/02; H01H 2003/12; H01H 2003/32; H01H 2009/02; H01H 2013/00; H01H 2013/02; H01H 2013/04; H01H 2013/52; H01H 2221/00; H01H 2221/024; H01H 2223/00; H01H 13/00; H01H 13/02; H01H 13/04; H01H 13/14; H01H 13/20; H01H 13/26; H01H 13/28; H01H 13/30; H01H 13/50; H01H 13/52; H01H 11/00; H01H 11/0056; H01H 2229/00; H01H 2229/04; H01H 2229/048; H01H 3/00; H01H 3/02; H01H 3/12; H01H 3/22; H01H 3/32; H01H 3/38; H01H 9/00; H01H 9/02; H01H 1/20; H01H 1/22; H01H 1/24; H01H 1/58

USPC ........................................................ 200/341

See application file for complete search history.

(56) References Cited

U.S. PATENT DOCUMENTS 5,171,945 A * 12/1992 Su ......................... H01H 13/28 200/6 R
2020/0258697 A1* 8/2020 Umezu .............. H01H 11/0056
2024/0105402 A1* 3/2024 Fujita ...................... H01H 1/58

FOREIGN PATENT DOCUMENTS

JP 6906183 7/2021

* cited by examiner

*Primary Examiner* — Anthony R Jimenez
(74) *Attorney, Agent, or Firm* — JCIPRNET

(57) ABSTRACT

A lead frame 10 includes first and second frames 13, 14 and a fixed contact piece 15. The fixed contact piece 15 is integrally formed with the first frame via a conductive connection part 16. The first frame and the fixed contact piece 15 and the second frame have installation parts 13*a*, 14*a*, 14*b*, 15*b* to which resistance elements are able to install. The first frame 13 and the fixed contact piece have installation parts 13*b*, 15*a* to which resistance elements are able to install. Electrical circuits of different types are formed through combinations of whether the resistance elements are installed to the respective installation parts and whether the conductive connection part 16 is cut off.

5 Claims, 14 Drawing Sheets

(a)

(b)

(a)

(b)

(a)

(b)

(a)

(b)

(a)

(b)

LEAD FRAME AND MANUFACTURING METHOD OF LEAD FRAME INSERT MOLDED ARTICLE

CROSS-REFERENCE TO RELATED APPLICATION

This application claims the priority benefit of Japan application serial No. 2022-154443, filed on Sep. 28, 2022. The entirety of the above-mentioned patent application is hereby incorporated by reference herein and made a part of this specification.

BACKGROUND

Technical Field

The invention relates to a lead frame forming an electrical circuit of a switch device, and a manufacturing method of a lead frame insert molded article in which the lead frame is integrated with a resin case of the switch device through insert molding.

Description of Related Art

Conventionally, a switch device having a built-in lead frame used for connection with an external circuit and forming an electrical circuit is known. Such lead frame generally includes multiple frames including portions forming a COM terminal and an NO terminal (or an NC terminal) and portions forming a fixed contact.

For example, in order to reduce the size of a switch with a built-in resistance element, Patent Document 1 discloses a switch including: a fixed contact piece, disposed vertically and electrically connected with a first terminal; an operator, moving vertically; an actuator, electrically connected with a second terminal, and contacting the fixed contact piece through movement of the operator; and a first resistance element, disposed in a region between the actuator and a base, and electrically connected in parallel with a contact part formed by the fixed contact piece and the actuator.

[Prior Art Document(s)]

[Patent Document(s)]

[Patent Document 1] Japanese Patent No. 6906183

The above switch device, as disclosed in Patent Document 1, includes a type having a parallel electrical circuit including a resistance element, a type having a serial electrical circuit including a resistance element, as well as a type not including a resistance element.

However, to realize such switch devices (electrical circuits) of different types, lead frames of different layouts (shapes) corresponding to the respective types are required. In addition, in the case where the shapes of the lead frames are different, in order to evaluate the influences on the performance of the switch devices, it is necessary to design the respective lead frames having different shapes and different molds are required. Thus, the cost may increase.

SUMMARY

An aspect of the invention provides a lead frame, forming an electrical circuit of a switch device and including: a first frame and a second frame respectively integrally formed with a first terminal part and a second terminal part connected with an external circuit; and a fixed contact piece. The lead frame switches an electrical connection state through whether the fixed contact piece and the second frame are brought into contact via a movable piece. The fixed contact piece is integrally formed with the first frame via a conductive connection part. At least one of the first frame and the fixed contact piece and the second frame are respectively provided with first installation parts to which resistance elements electrically connecting both of the at least one of the first frame and the fixed contact piece and the second frame are able to install. The first frame and the fixed contact piece are respectively provided with second installation parts to which the resistance elements electrically connecting both of the first frame and the fixed contact piece are able to install. Through combinations of whether the resistance elements are installed to the respective installation parts and whether the conductive connection part is cut off, an electrical circuit not comprising the resistance elements, a serial electrical circuit comprising the resistance elements, or a parallel electrical circuit comprising the resistance elements is formed. Another aspect of the invention provides a manufacturing method of a lead frame insert molded article in which a lead frame is integrated with a resin case having a bottomed cylindrical shape through insert molding, so that a first terminal part and a second terminal part protrude in a cylinder axial direction from a bottom part of the resin case. The lead frame includes: a first frame, integrally formed with the first terminal part; a second frame, integrally formed with the second terminal part extending in a direction same as the first terminal part; and a fixed contact piece, integrally formed with the first frame via a conductive connection part, and having a protrusion part which extends in the direction same as the first terminal part and the second terminal part and in which a tip end part is integrally formed with the first terminal part and the second terminal part via a connection part. The manufacturing method of the lead frame insert molded article includes: a pressing process of forming the lead frame from a conductive plate; a first cutting process of cutting off the conductive connection part in the lead frame formed in the pressing process; a mounting process of mounting resistance elements to the lead frame; a resin sealing process of resin sealing the resistance elements mounted in the mounting process together with the first frame and the second frame and the fixed contact piece by insert molding while positioning the lead frame on a side of the first terminal part and the second terminal part, and molding the resin case so that the first terminal part and the second terminal part and the tip end part of the protrusion part protrude from the bottom part; and a second cutting process of cutting off the connection part to separate the tip end part of the protrusion part from the first terminal part and the second terminal part.

Figure 4:
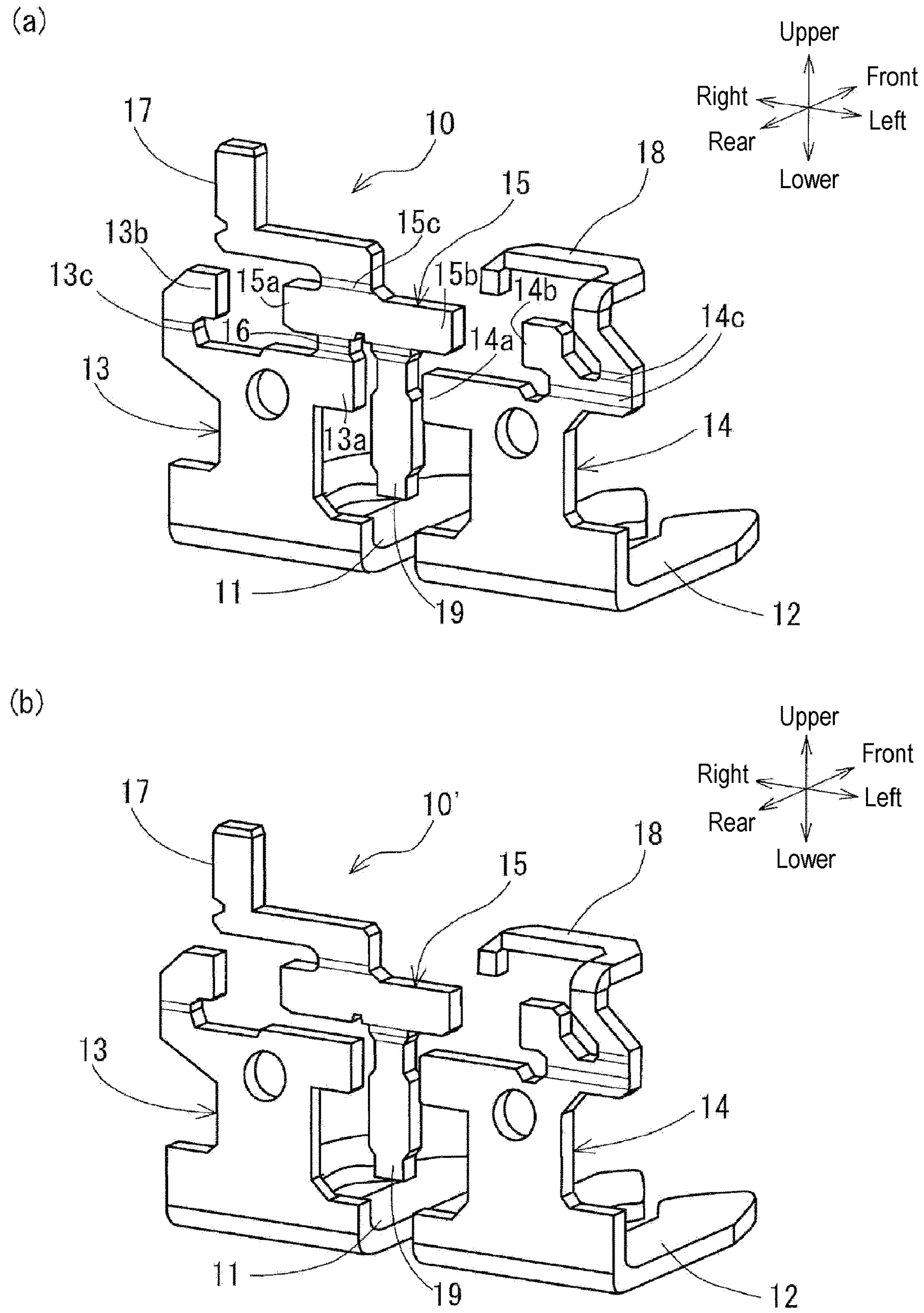

(*a*) and (*b*) of FIG. 4 are schematic perspective views illustrating the lead frame, where (*a*) of FIG. 4 illustrates a state in which a conductive connection part remains, and (*b*) of FIG. 4 illustrates a state in which the conductive connection part is cut off.

Figure 5:
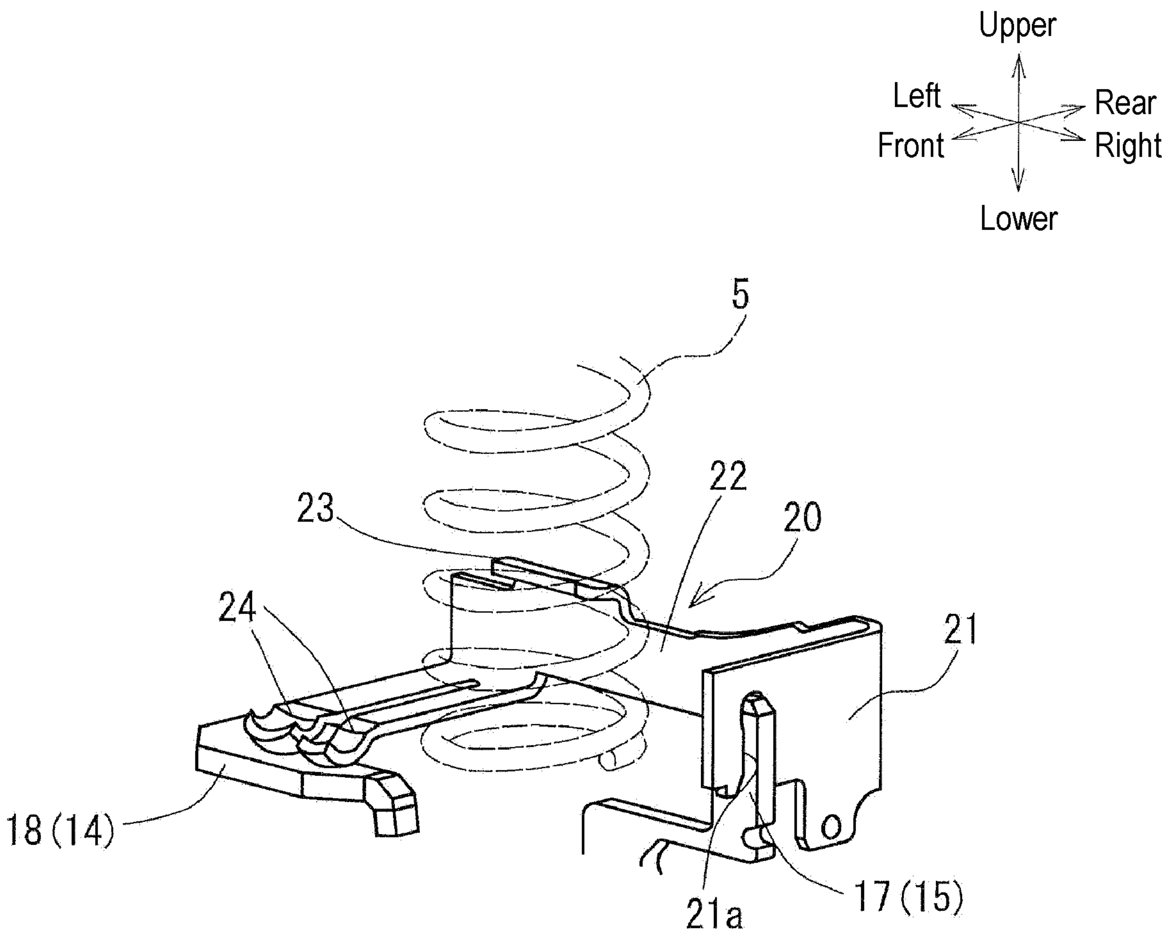

FIG. 5 is a schematic perspective view illustrating a contact structure of a movable piece.

Figure 6:
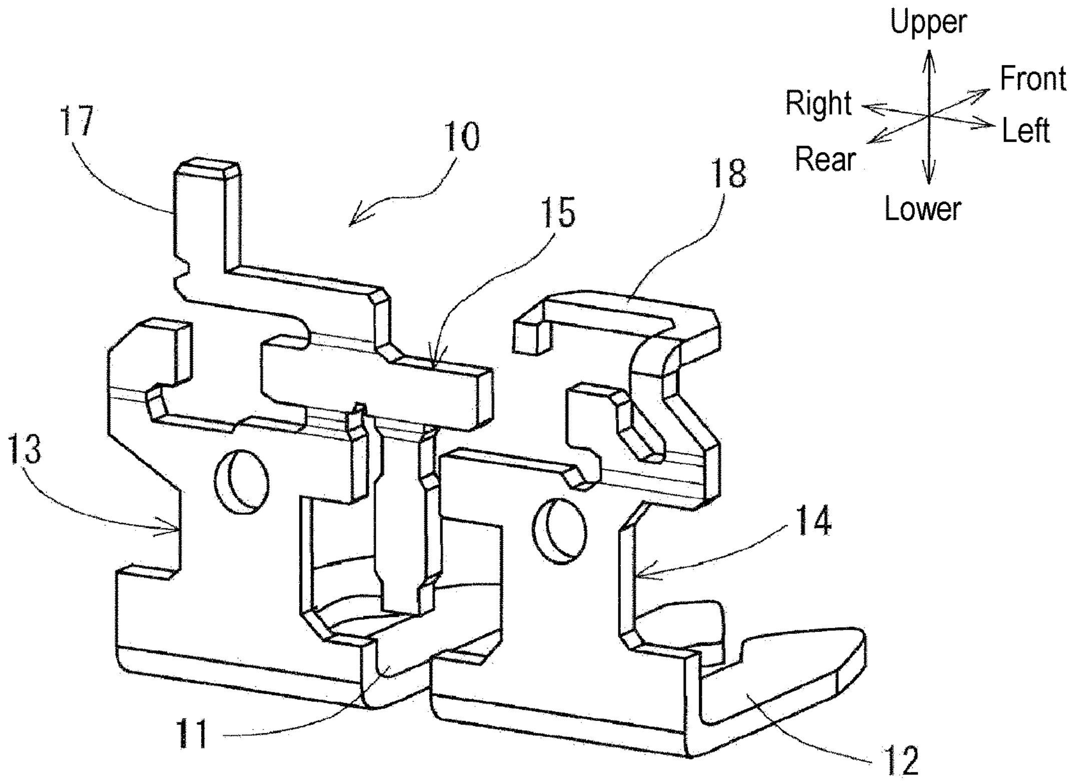
Figure 6:
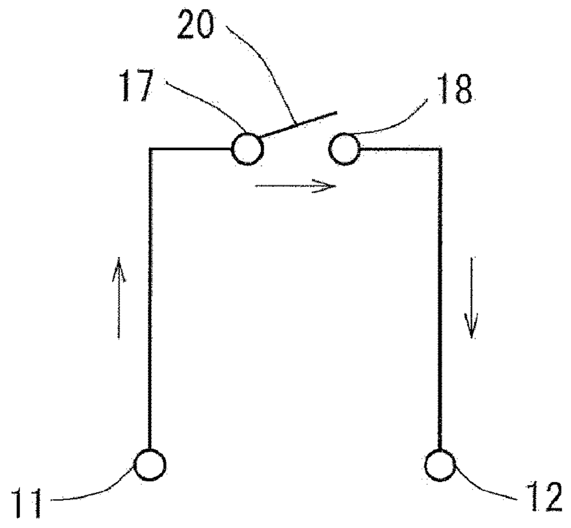

(*a*) and (*b*) of FIG. 6 are schematic views illustrating an example of an electrical circuit not including a resistance element, where (*a*) of FIG. 6 illustrates a perspective view of a lead frame, and (b) of FIG. 6 illustrates a circuit diagram.

Figure 7:
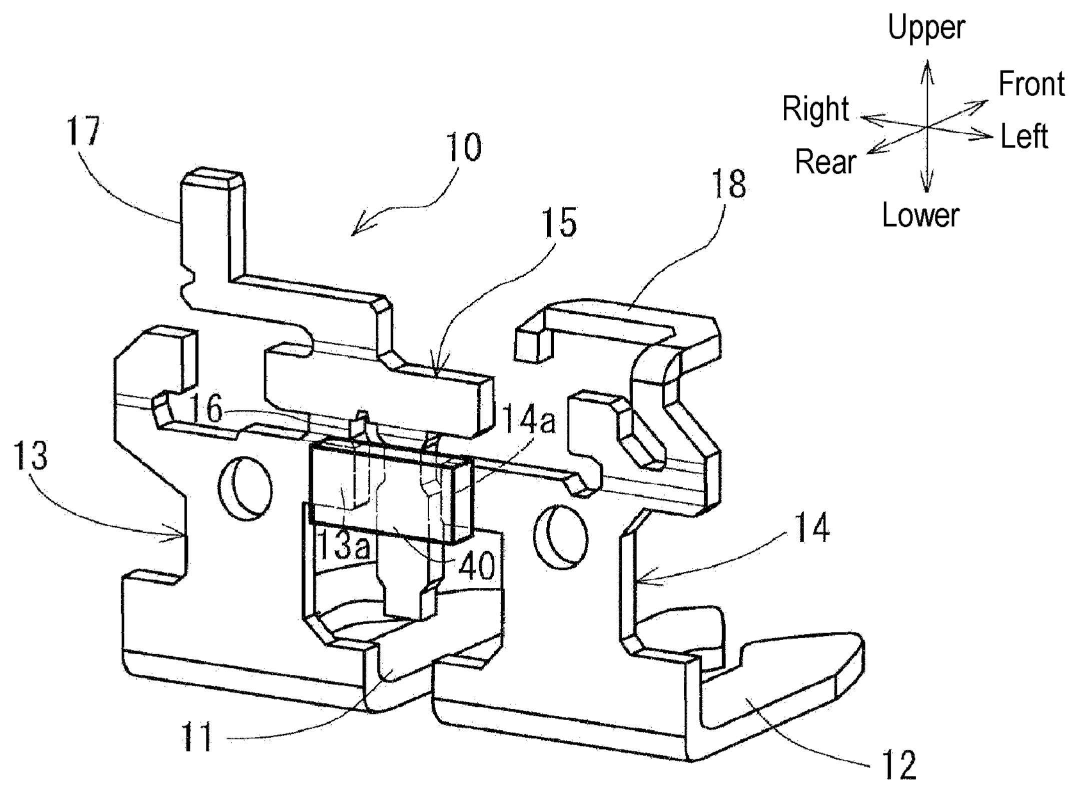
Figure 7:
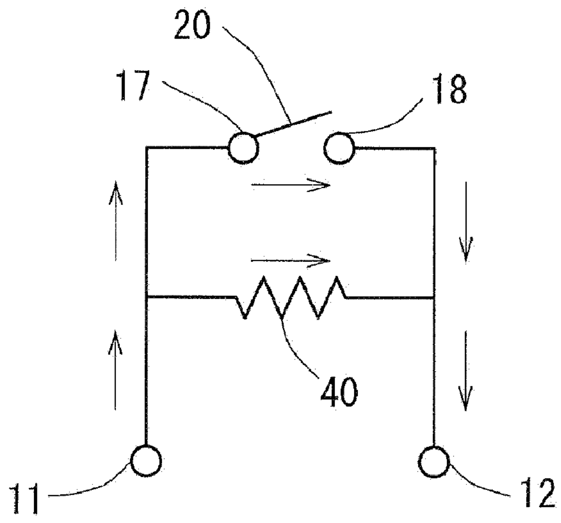

(*a*) and (*b*) of FIG. 7 are schematic views illustrating an example of a parallel electrical circuit including one resistance element, where (*a*) of FIG. 7 illustrates a perspective view of a lead frame, and (b) of FIG. 7 illustrates a circuit diagram.

Figure 8:
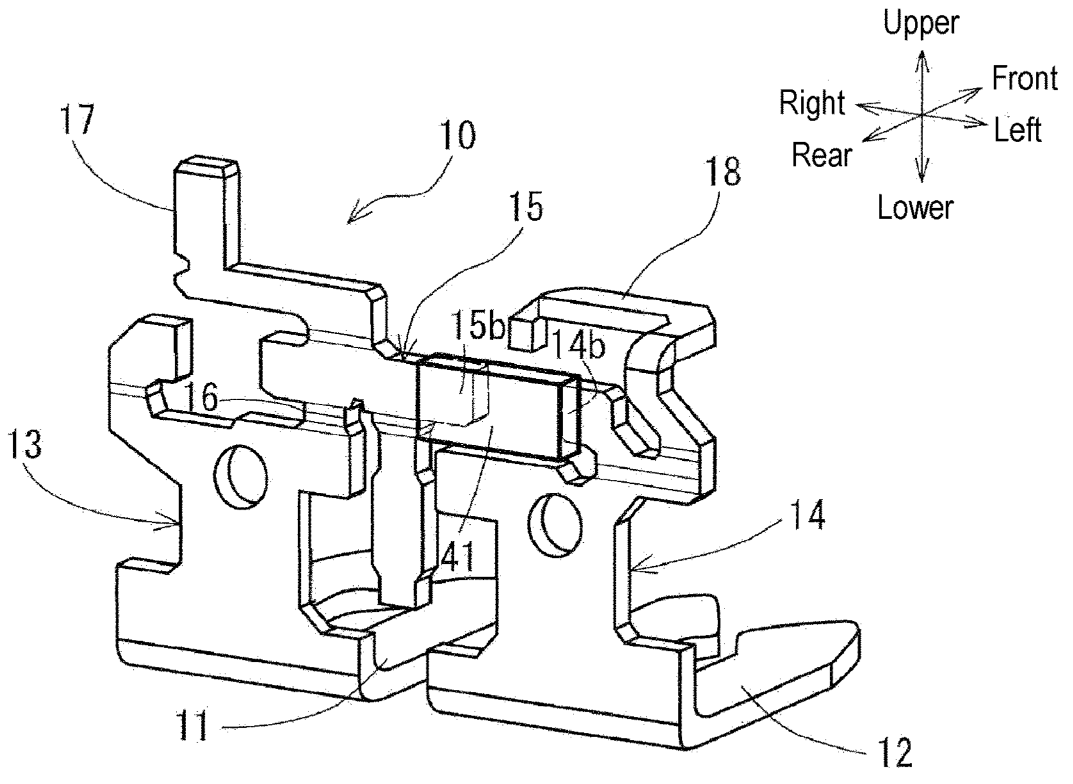
Figure 8:
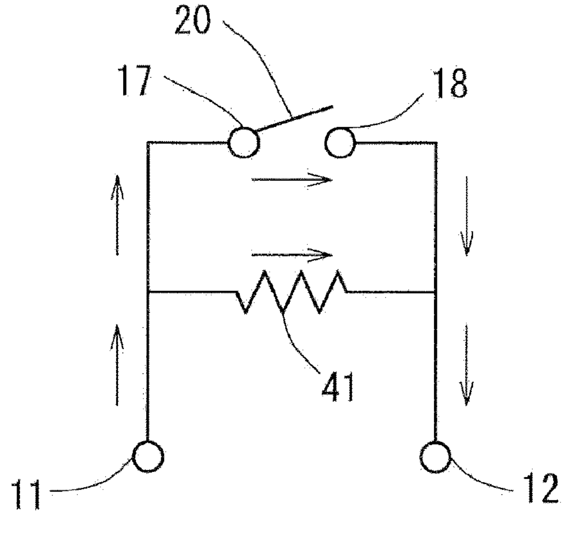

(*a*) and (*b*) of FIG. 8 are schematic views illustrating an example of a parallel electrical circuit including one resistance element, where (*a*) of FIG. 8 illustrates a perspective view of a lead frame, and (b) of FIG. 8 illustrates a circuit diagram.

Figure 9:
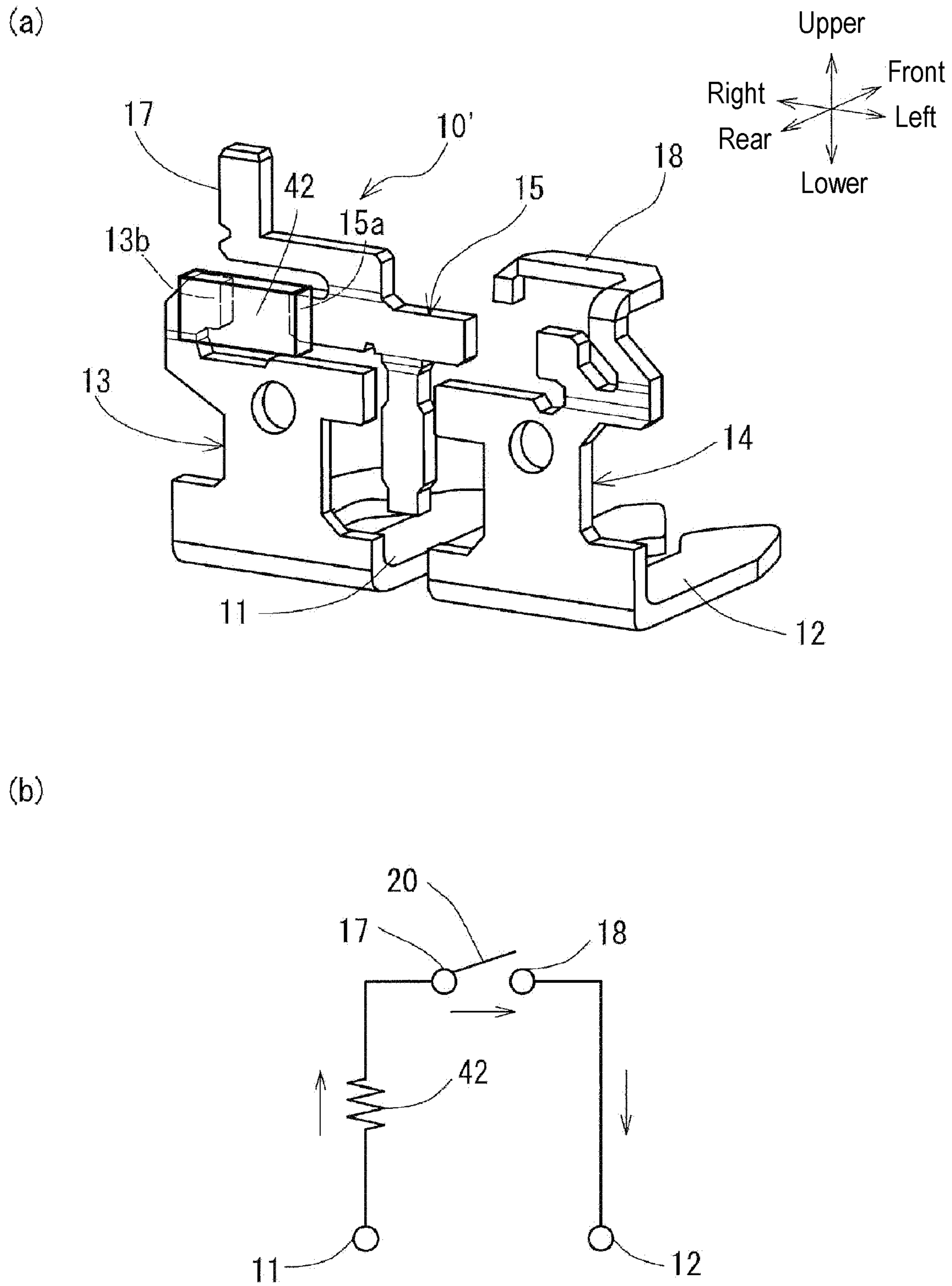

(*a*) and (*b*) of FIG. 9 are schematic views illustrating an example of a serial electrical circuit including one resistance element, where (*a*) of FIG. 9 illustrates a perspective view of a lead frame, and (*b*) of FIG. 9 illustrates a circuit diagram.

Figure 10:
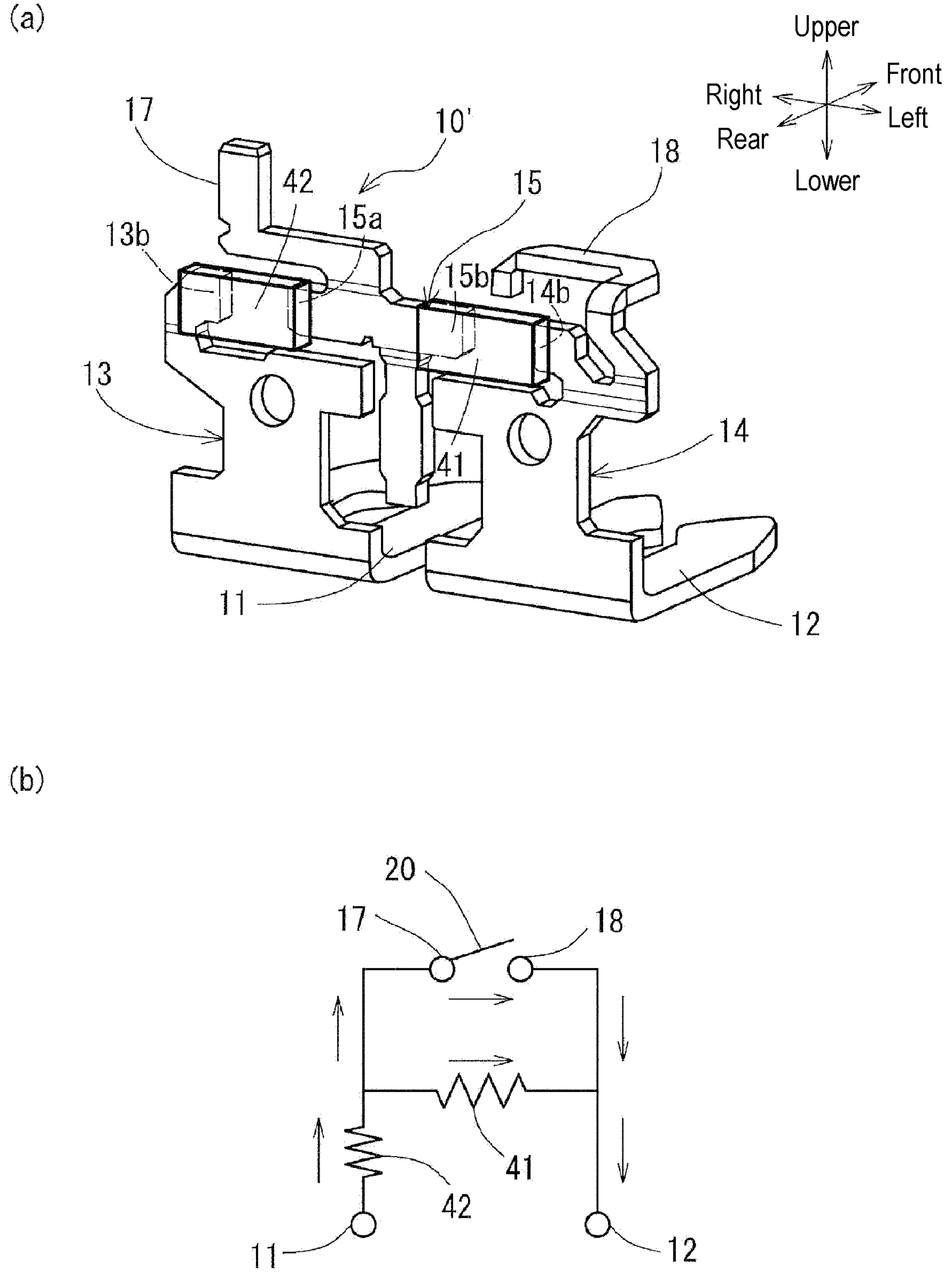

(*a*) and (*b*) of FIG. 10 are schematic views illustrating a parallel electrical circuit including two resistance elements, where (*a*) of FIG. 10 illustrates a perspective view of a lead frame, and (*b*) of FIG. 10 illustrates a circuit diagram.

Figure 11:
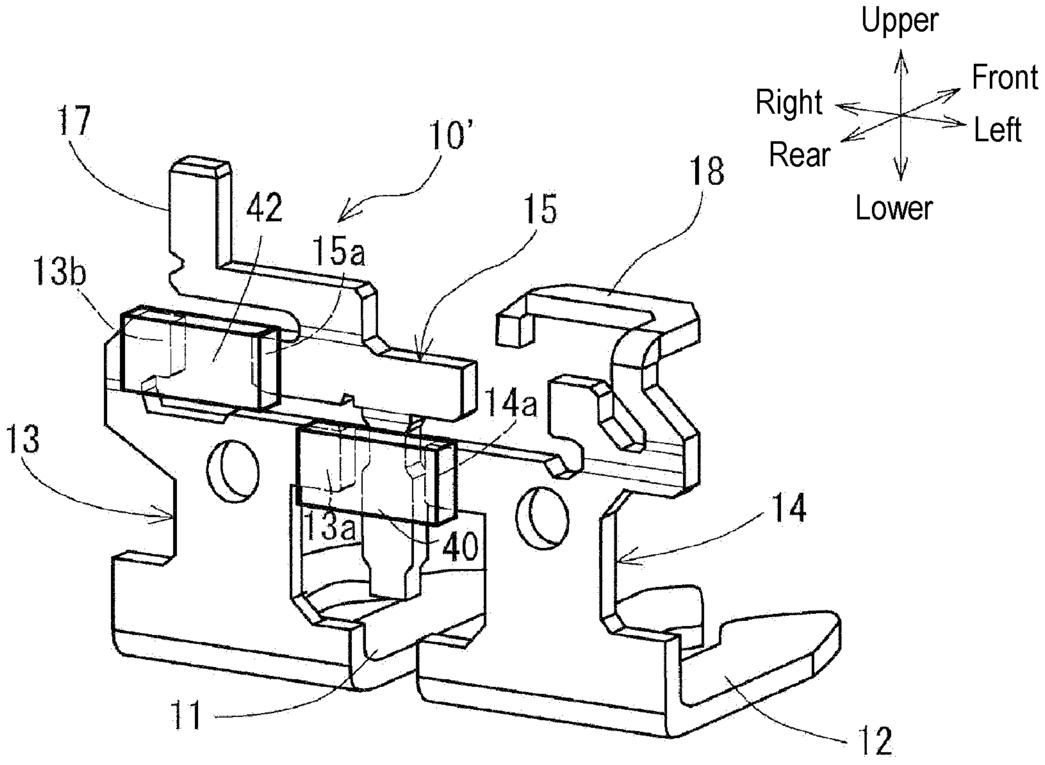
Figure 11:
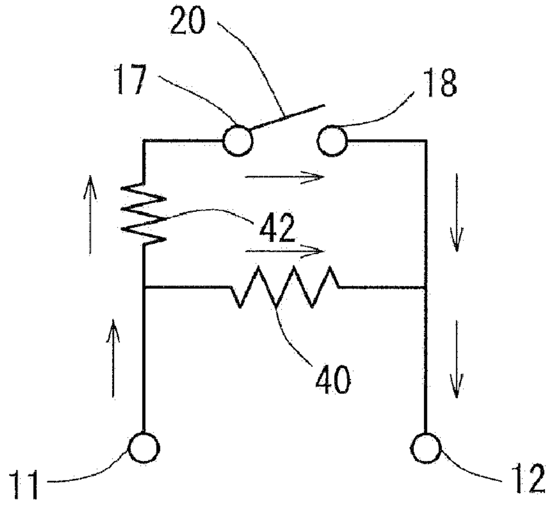

(*a*) and (*b*) of FIG. 11 are schematic views illustrating a parallel electrical circuit including two resistance elements, where (*a*) of FIG. 11 illustrates a perspective view of a lead frame, and (*b*) of FIG. 11 illustrates a circuit diagram.

Figure 12:
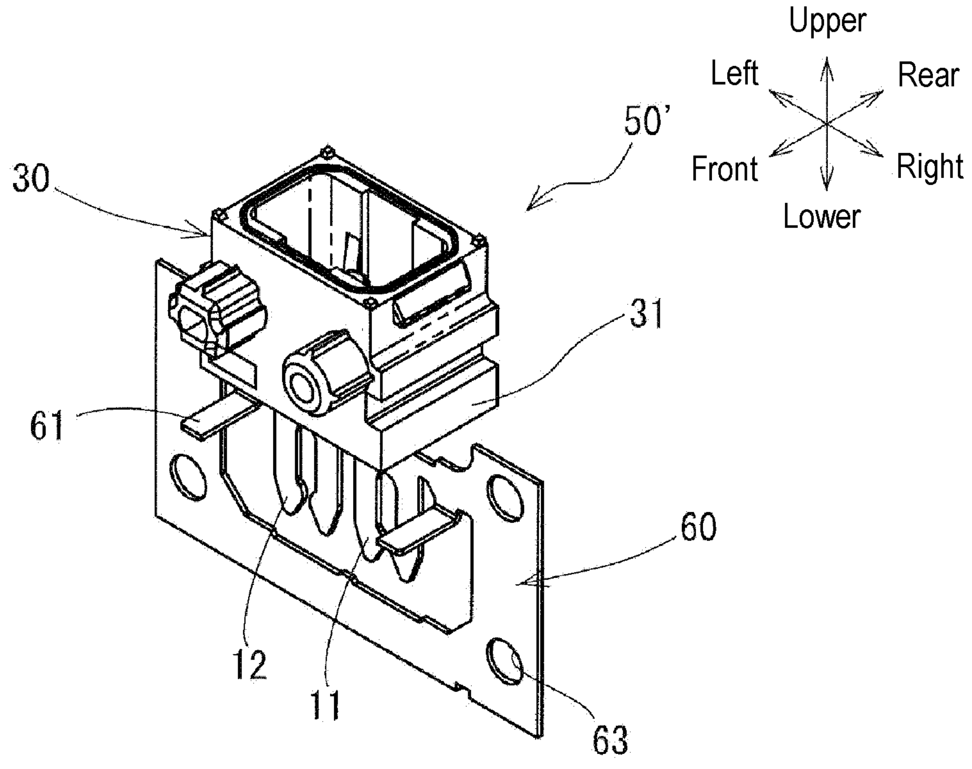
Figure 12:
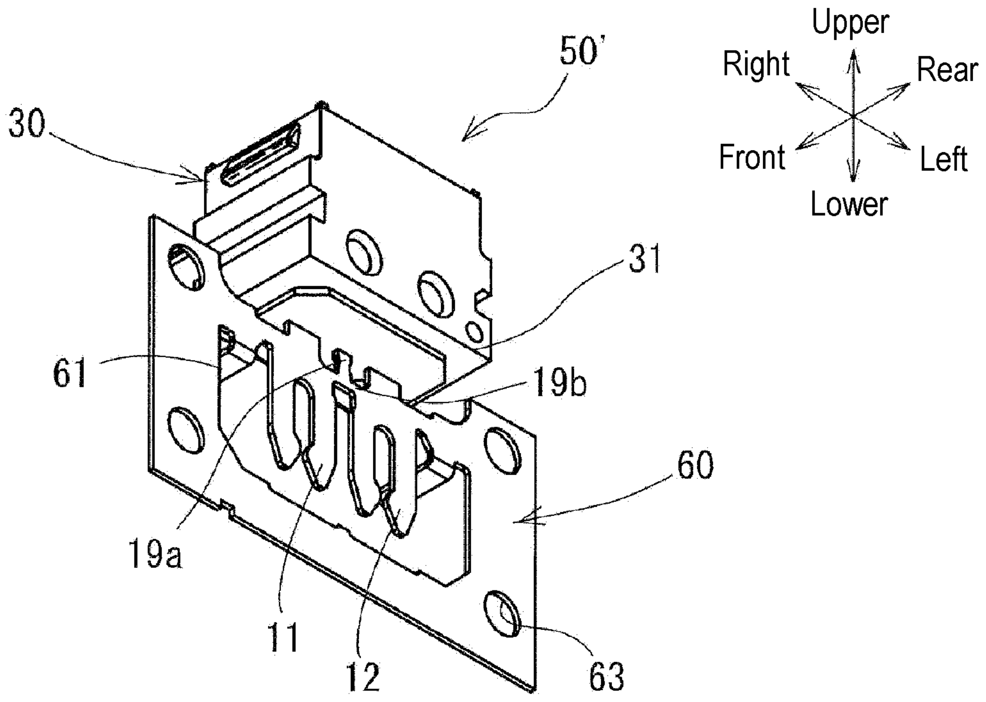

(*a*) and (*b*) of FIG. 12 are schematic perspective views illustrating an example of a semi-finished article of a lead frame insert molded article, where (*a*) of FIG. 12 illustrates a view that is viewed from an oblique upper side, and (*b*) of FIG. 12 illustrates a view that is viewed from an oblique lower side.

Figure 13:
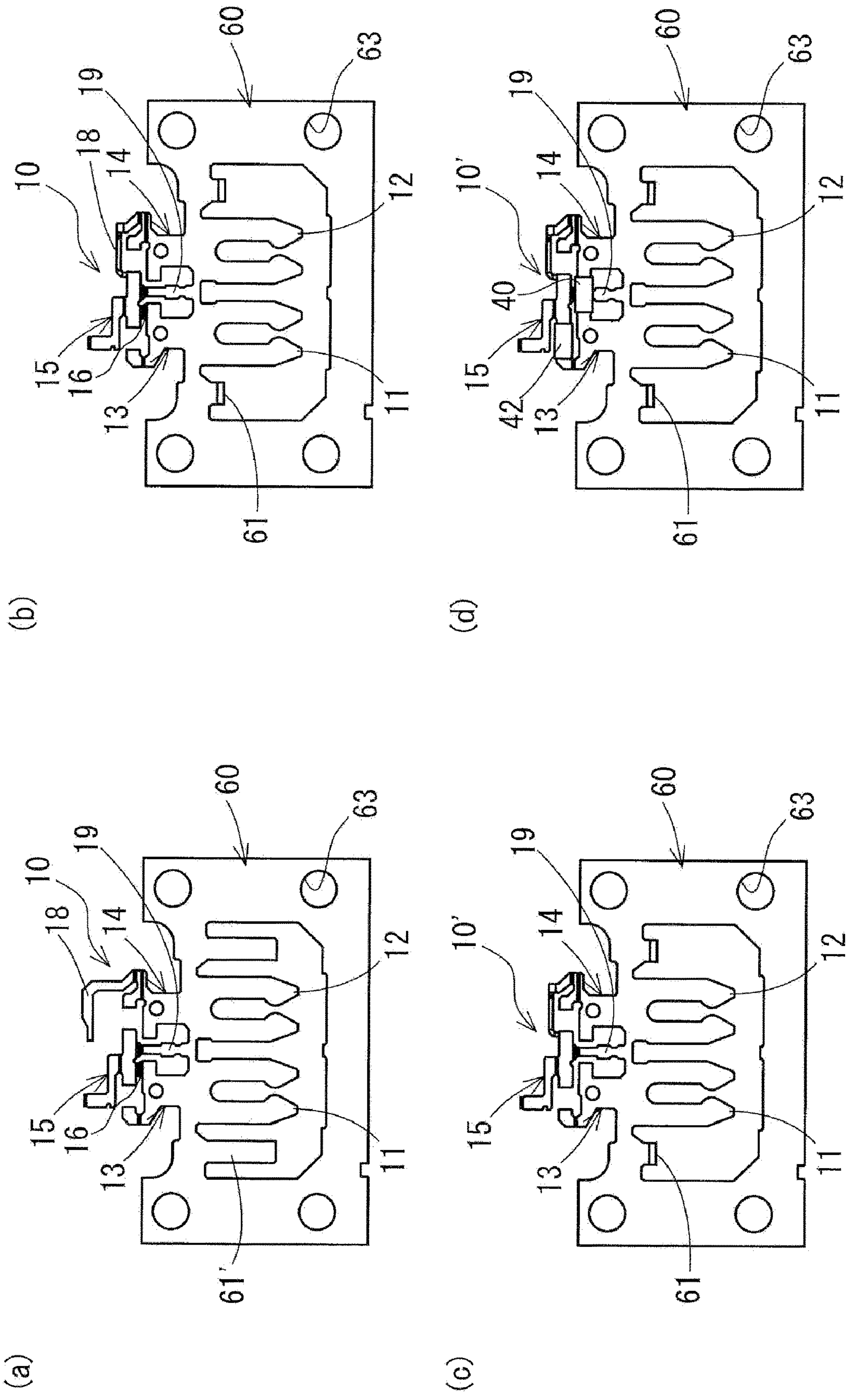

(*a*) to (*d*) of FIG. 13 are schematic views illustrating a manufacturing method of a lead frame insert molded article according to an embodiment of the disclosure.

Figure 14:
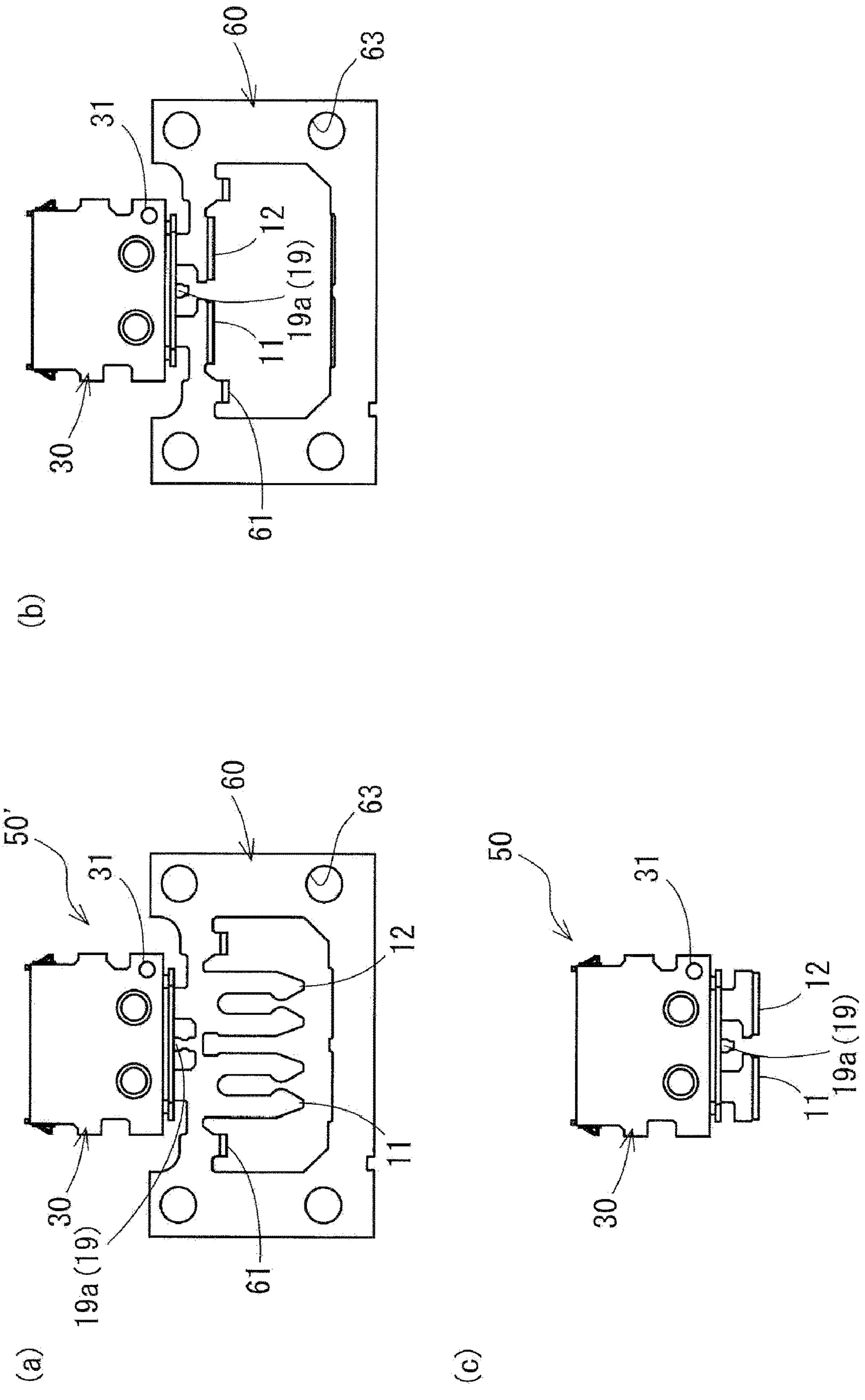

(*a*) to (*c*) of FIG. 14 are schematic views illustrating a manufacturing method of a lead frame insert molded article.

DESCRIPTION OF THE EMBODIMENTS

The invention realizes electrical circuits of different types by using a common lead frame.

In order to achieve the objective, an example of the disclosure provides a lead frame. The lead frame forms an electrical circuit of a switch device and includes: a first frame and a second frame respectively integrally formed with a first terminal part and a second terminal part connected with an external circuit; and a fixed contact piece. The lead frame switches an electrical connection state through whether the fixed contact piece and the second frame are brought into contact via a movable piece. The fixed contact piece is integrally formed with the first frame via a conductive connection part. At least one of the first frame and the fixed contact piece and the second frame are respectively provided with first installation parts to which resistance elements electrically connecting both of the at least one of the first frame and the fixed contact piece and the second frame are able to install. The first frame and the fixed contact piece are respectively provided with second installation parts to which the resistance elements electrically connecting both of the first frame and the fixed contact piece are able to install. Through combinations of whether the resistance elements are installed to the respective installation parts and whether the conductive connection part is cut off, an electrical circuit not including the resistance elements, a serial electrical circuit including the resistance elements, or a parallel electrical circuit including the resistance elements is formed.

According to the configuration, for example, in the case of (1) where the conductive connection part remains (no cutting) and a resistance element is not installed (no installation), an electrical circuit in which a current flows through [the first terminal part, the first frame, the conductive connection part, the fixed contact piece, the movable piece, the second frame, and the second terminal part] and which does not include a resistance element is formed.

In addition, for example, in the case of (2) where the conductive connection part remains (no cutting) and a resistance element is installed (with installation) to the first installation part, a parallel electrical circuit in which a current flows through [the first terminal part, the first frame, the conductive connection part, the fixed contact piece, the movable piece, the second frame, and the second terminal part] in parallel with a current flowing through [the first terminal part, the first frame (or the first frame, the conductive connection part, and the fixed contact piece), the resistance element, the second frame, and the second terminal part] and which includes one resistance element is formed.

According to the configuration, for example, in the case of (3) where the conductive connection part is cut off (with cutting) and a resistance element is installed (with installation) to the second installation part, an electrical circuit in which a current flows through [the first terminal part, the first frame, the resistance element, the fixed contact piece, the movable piece, the second frame, and the second terminal part] and which includes a resistance element is formed.

In addition, for example, in the case of (4) where the conductive connection part is cut off (with cutting) and resistance elements are installed (with installation) to the first installation part and the second installation part, a parallel electrical circuit in which a current flows through [the first terminal part, the first frame, the resistance element, the fixed contact piece, the movable piece, the second frame, and the second terminal part] in parallel with a current flowing through [the first terminal part, the first frame, the resistance element, the second frame, and the second terminal part] and which includes two resistance elements is formed.

In this way, in the lead frame according to an example of the disclosure, electrical circuits of different types, as exemplified in (1) to (4) above, can be formed through the combinations of whether the resistance elements are installed to the respective installation parts and whether the conductive connection part is cut off.

Moreover, in the case of forming the electrical circuits of different types, since only the installation of the resistance elements and the cutting of the conductive connection part are performed, the electrical circuits of different types can be realized by using a common lead frame. Accordingly, it is possible to standardize the design and share the mold, so the cost increase can be suppressed.

In addition, in the lead frame, it may also be that the first frame and the second frame and the fixed contact piece are integrated with a resin case in a bottomed cylindrical shape by insert molding, so that the first terminal part and the second terminal part protrude side-by-side from a bottom part of the resin case in a cylinder axial direction, the fixed contact piece is provided with a protrusion part extending in a direction same as the first terminal part and the second terminal part, and in the protrusion part, a tip end part protruding from the bottom part is integrally formed with the first terminal part and the second terminal part via a connection part in a state of being integrated with the resin case.

At the time when the lead frame is integrated with the resin case in a bottomed cylindrical shape through insert molding, positioning is generally performed on the side of the first terminal part and second terminal part protruding in the cylinder axial direction from the bottom part of the resin case after insert molding. In such positioning method, in the case where the conductive connection part is cut off, the edge between the fixed contact piece and the first frame is cut off, and the case where it is difficult to position the fixed contact piece is considered.

Regarding this point, according to the configuration, the tip end part of the protrusion part extending from the fixed contact piece is integrally formed with the first terminal part and the second terminal part via the connection part. Therefore, even in the case where the conductive connection part is cut off, by performing positioning on the side of the first terminal part and the second terminal part, the fixed contact piece can be easily positioned.

Moreover, the tip end part of the protrusion part integrally formed with the first and second terminal parts via the connection part protrudes from the bottom part in the state of being integrated with the resin case. Therefore, by cutting off the connection part after insert molding, that a current flows between the first terminal part and the second terminal part via the protrusion part can be easily prevented.

In addition, in the lead frame, it may also be that in a case of forming an electrical circuit including the resistance elements, the resistance elements are integrated with the resin case through insert molding.

According to the configuration, the concern that the resin case is melt, etc., due to the heat of soldering the resistance elements like the case of installing the resistance elements to the first installation part and/or the second installation part after insert molding does not arise. Consequently, the assembleability of the switch device can be facilitated. In addition, since the resistance elements are not exposed, the corrosion and deterioration of the electrode parts in the resistance elements can be suppressed.

In the lead frame, it may also be that, in the first frame and the second frame and the fixed contact piece, serrated grooves are formed on front and back surfaces between portions forming electrical contacts and the first installation parts as well as the second installation parts.

According to the configuration, in the case where cream solder is coated on the first installation part and the second installation part, the solder hardly crosses over the serrated grooves due to the surface tension of the coated solder. Therefore, the cream solder can be suppressed from flowing out. In addition, the adhesion between resin and metal is reinforced by the serrated grooves, and the sealing properties can be expected to improve.

In addition, an example according to the disclosure provides a manufacturing method of a lead frame insert molded article in which a lead frame is integrated with a resin case having a bottomed cylindrical shape through insert molding, so that a first terminal part and a second terminal part protrude in a cylinder axial direction from a bottom part of the resin case. The lead frame includes: a first frame, integrally formed with the first terminal part; a second frame, integrally formed with the second terminal part extending in a direction same as the first terminal part; and a fixed contact piece, integrally formed with the first frame via a conductive connection part, and having a protrusion part which extends in the direction same as the first terminal part and the second terminal part and in which a tip end part is integrally formed with the first terminal part and the second terminal part via a connection part. The manufacturing method of the lead frame insert molded article includes: a pressing process of forming the lead frame from a conductive plate; a first cutting process of cutting off the conductive connection part in the lead frame formed in the pressing process; a mounting process of mounting resistance elements to the lead frame; a resin sealing process of resin sealing the resistance elements mounted in the mounting process together with the first frame and the second frame and the fixed contact piece by insert molding while positioning the lead frame on a side of the first terminal part and the second terminal part and molding the resin case so that the first terminal part and the second terminal part and the tip end part of the protrusion part protrude from the bottom part; and a second cutting process of cutting off the connection part to separate the tip end part of the protrusion part from the first terminal part and the second terminal part.

According to the configuration, it is easy to manufacture the lead frame insert molded article in which the lead frame able to form electrical circuits of different types is integrated with the resin case while positioning the fixed contact piece even in the case where the conductive connection part is cut off.

As described above, according to the invention, electrical circuits of different types can be realized by using a common lead frame.

Hereinafter, the form for implementing an example of the disclosure is demonstrated with reference to the drawings.

—Switch Device—

Figure 1:
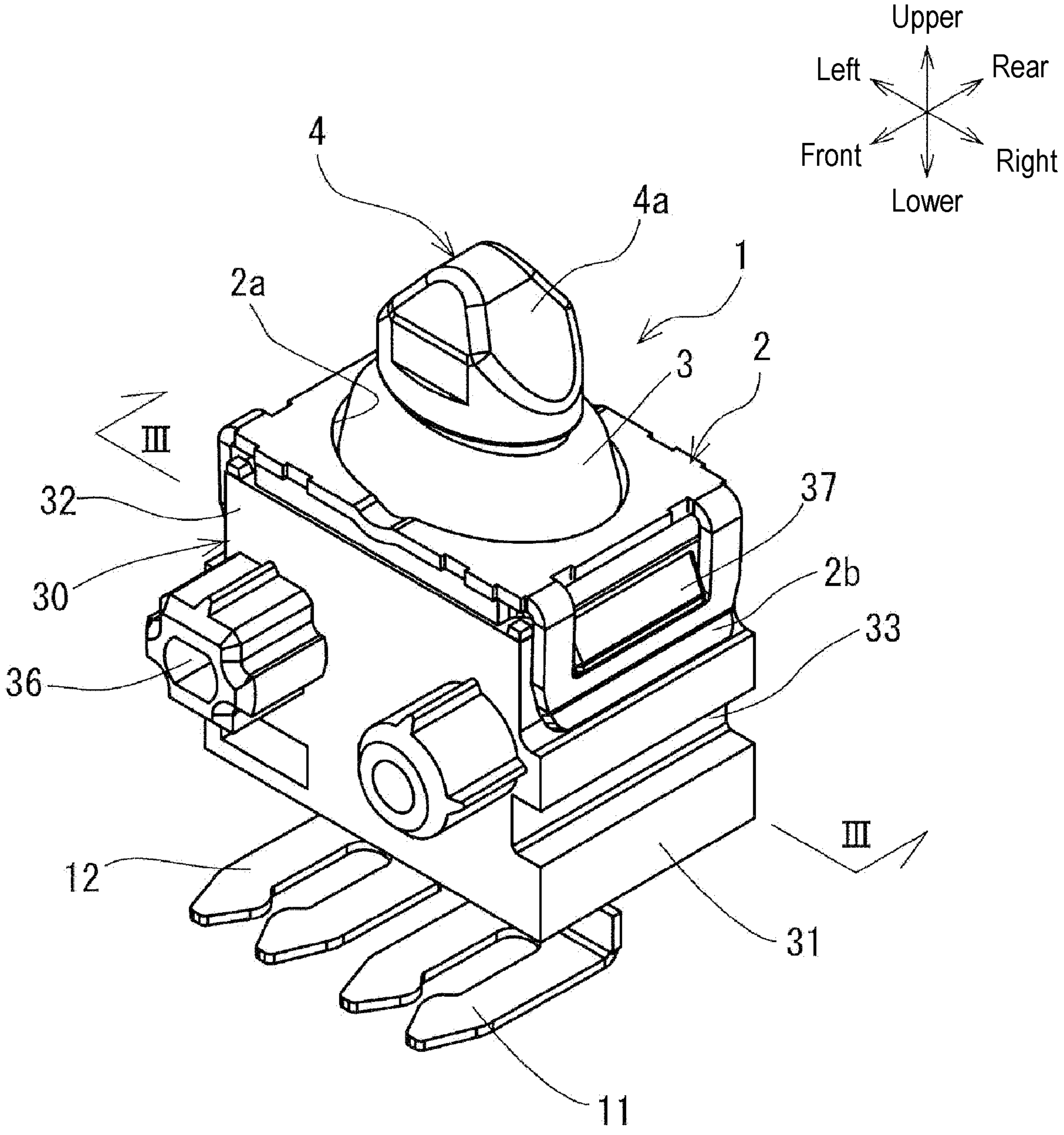
FIG. 1 is a schematic perspective view illustrating a switch device including a lead frame according to an embodiment of the disclosure.
Figure 2:
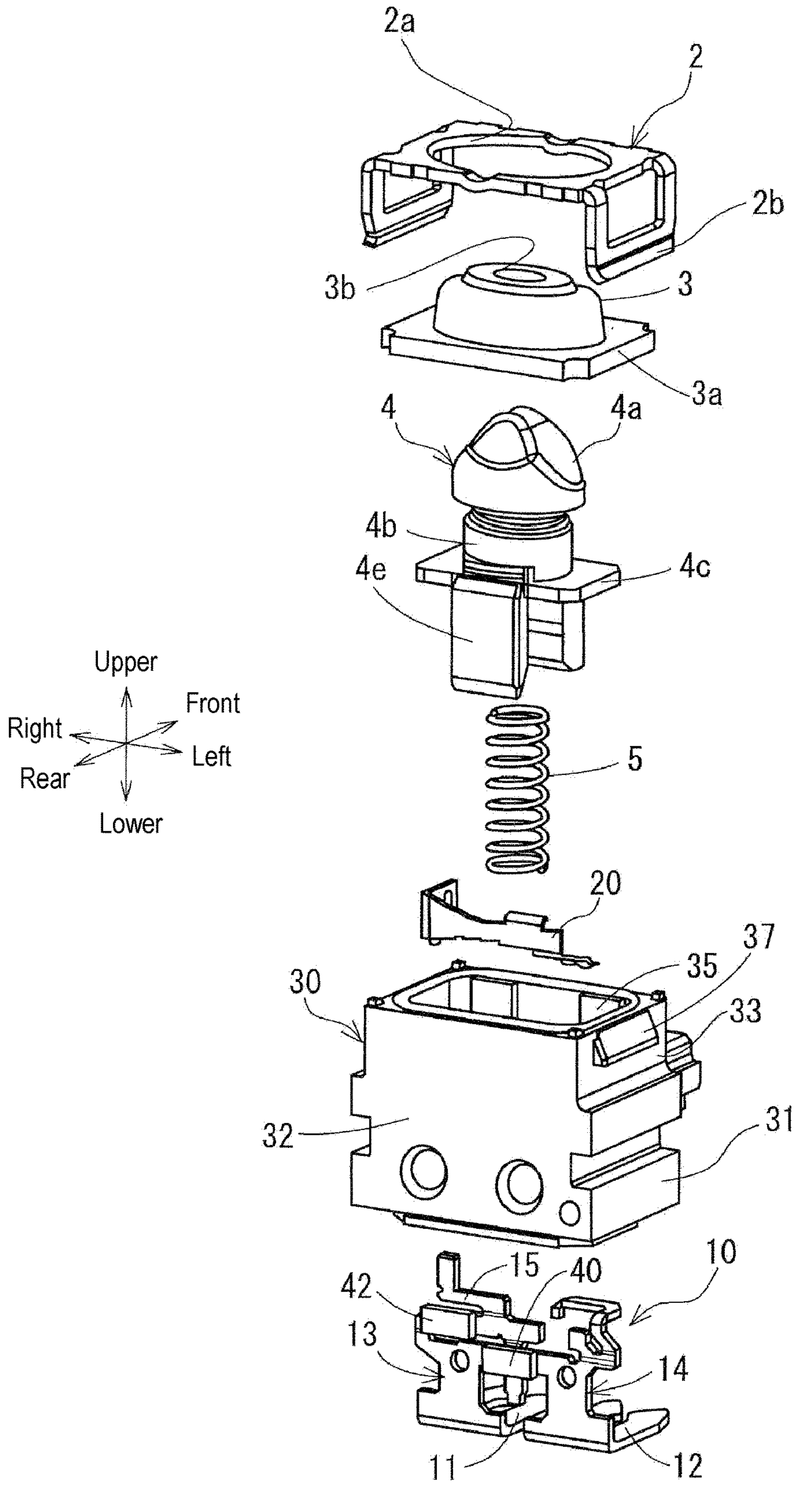
FIG. 2 is a schematic exploded perspective view illustrating the switch device.
Figure 3:
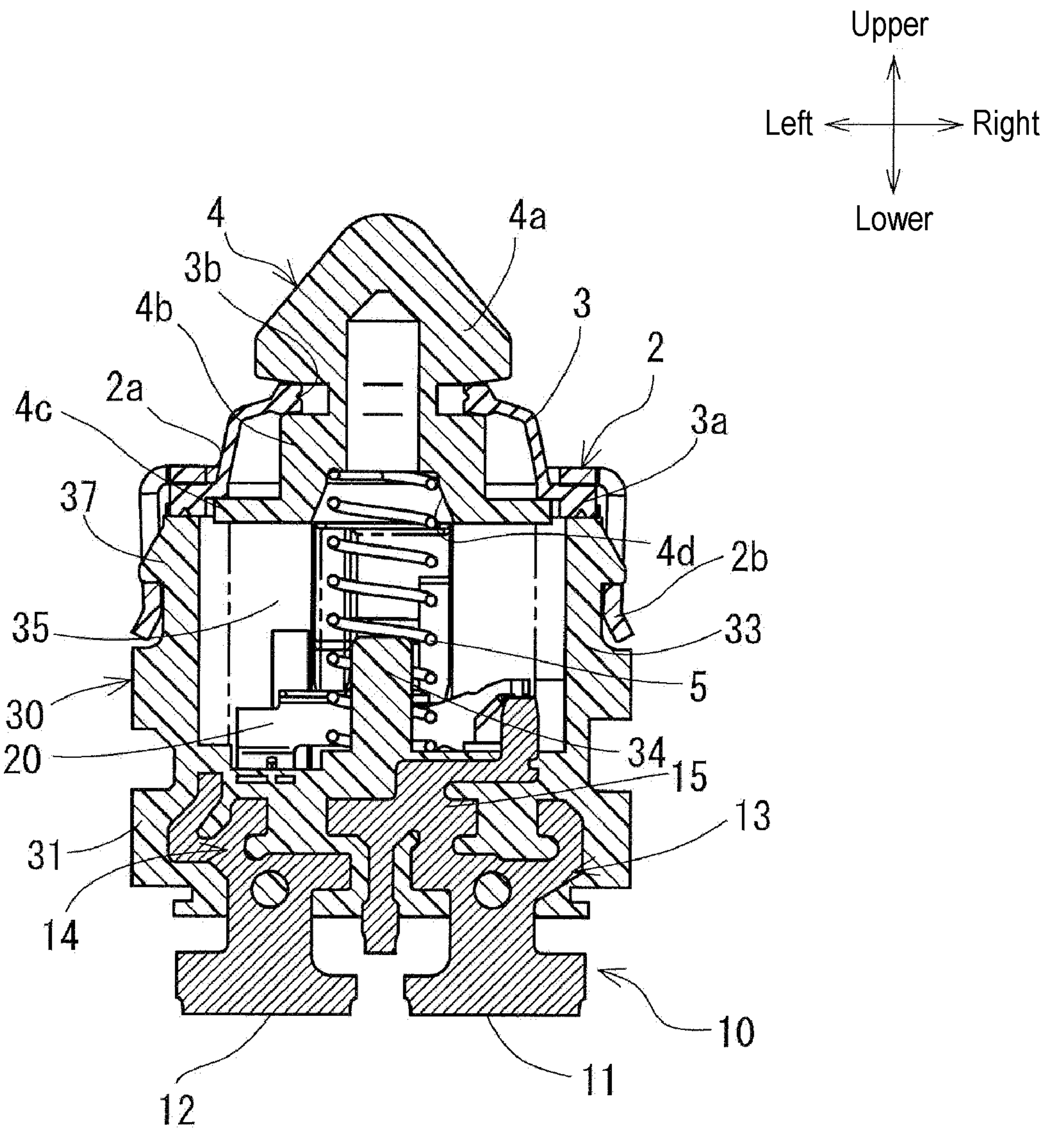
FIG. 3 is an arrow sign cross-sectional view taken along a line III-III of FIG. 1.

FIG. 1 is a schematic perspective view illustrating a switch device 1 including a lead frame 10 according to an embodiment. FIG. 2 is a schematic exploded perspective view illustrating the switch device 1. FIG. 3 is an arrow sign cross-sectional view taken along a line III-III of FIG. 1. The switch device 1 is a switch device used as a vehicle-mounted micro switch, for example. First and second terminal parts 11, 12 are connected with an external circuit, such as a vehicle-mounted electronic control unit (ECU), and detect opening/closing of a door, etc.

In the following, for the ease of description, the upper-lower direction, the front-rear direction, and the left-right direction are defined as indicated by the arrow signs in the drawings. However, these directions do not limit the directions of the switch device 1 in practical use.

The switch device 1, as shown in FIG. 2, includes a cover 2, a cap rubber 3, an operator 4, a spring 5, a movable piece 20, a resin case 30, and a lead frame 10. In FIG. 2, resistance elements 40, 42 are installed to the lead frame 10. However, the resistance elements 40, 42 are not required to be installed. In addition, even if the resistance elements 40, 42 are installed, the installation positions are not limited to the positions shown in FIG. 2.

As will be described in detail in the following, the lead frame 10 includes a first frame 13 integrally formed with a first terminal part 11, a second frame 14 integrally formed with a second terminal part 12, and a fixed contact piece 15. The lead frame 10 forms an electrical circuit that switches an electrical connection state in the switch device 1 based on whether the second frame 14 and the fixed contact piece 15 are brought into contact via the movable piece 20.

The resin case 30 includes a base (bottom part) 31 having a substantially rectangular shape orthogonal to the upper-lower direction, a pair of first vertical wall parts 32 extending upward from the long sides of the base 31, and a pair of second vertical wall parts 33 extending upward from the short sides of the base 31, and is formed in a bottomed rectangular cylindrical shape. As shown in FIGS. 1 and 3, in the resin case 30, the base 31 is integrated with the first and second frames 13, 14 and the fixed contact piece 15 by insert molding, so that the first and second terminal parts 11, 12 protrude from the base 31 in a cylinder axial direction (downward). In the case where the resistance elements 40, 42 are installed, the resistance elements 40, 42 are also integrated with the base 31 through insert molding.

As shown in FIG. 3, a positioning boss 34 having a cylindrical columnar shape and extending upward from the central part thereof is formed on the base 31. In addition, a pair of guide parts 35 are formed laterally on the inner side surface of each first vertical wall part 32. In addition, on the outer side surfaces of the first vertical wall parts 32 on the front side, a pair of pins 36 fittable with a vehicle member on the periphery of the switch device 1 are provided. In addition, a substantially wedge-shaped engaged part 37 is formed on the outer side surface of each second vertical wall part 33.

As shown in FIG. 3, the spring 5 is installed to the base 31, so that the positioning boss 34 is inserted through on the inner side of the lower end part thereof.

As shown in FIG. 2, the operator 4 has a base part 4*c*, a shaft part 4*b* extending upward from the central part of the base part 4*c*, a pressing button 4*a* provided at the upper end of the shaft part 4*b*, and a pair of guided parts 4*e* extending downward from the long sides of the base part 4*c* to be opposite in the front-rear direction. As shown in FIG. 3, a concave part 4*d* in a cut-head truncated conical shape recessed upward is formed at the base part 4*c* and the shaft part 4*b*. In addition, on the inner side surface of the guided part 4*e* on the rear side, a sliding part (not shown) is formed.

As shown in FIG.3, the operator 4 so configured is installed to the resin case 30, so that the upper end part of the spring 5 is accommodated in the concave part 4*d*, the outer side surfaces of the pair of guided parts 4*e* contact the inner side surfaces of the pair of first vertical wall parts 32, and each of the guided parts 4*e* is sandwiched laterally by the pair of left and guide parts 35 arranged laterally and formed on the inner side surface of each of the first vertical wall parts 32. Accordingly, the operator 4 is constantly biased upward by the spring 5 and slides straight in the upper-lower direction along the inner side surface of each first vertical wall part 32 and the guide parts 35. By doing so, when the pressing button 4*a* is pressed downward against the biasing force of the spring 5, the operator 4 slides downward, and, with the sliding part formed on the inner side surface of the guided part 4*e* on the rear side pressing an engagement protrusion part 23 (see FIG. 5) of the movable piece 20, the movable piece 20 swings substantially vertically (front side) with respect to the sliding direction of the operator 4. Accordingly, the movable piece 20 installed to the fixed contact piece 15 contacts the second frame 14.

As shown in FIG. 3, the cap rubber 3 is installed to the resin case 30 by sandwiching a flange part 3*a* between the upper end parts of the first and second vertical wall parts 32, 33 and the outer edge part of the cover 2. In this way, when the cap rubber 3 is installed to the resin case 30, the pressing button 4*a* protrudes upward from an opening part 3*b* of the cap rubber 3. The cap rubber 3 prevents a foreign matter, such as water, dust, etc., from entering the resin case 30, and is formed by an elastic material, such as rubber, with excellent properties such as waterproofness, dustproofness, flexibility, to elastically deform with the movement of the operator 4.

The cover 2 is formed in a substantially rectangular frame shape having a circular opening part 2*a* at the central part thereof, and has an engagement part 2*b* in a substantially C shape extending downward from the two end parts in the left-right direction. The cover part 2 is installed to the resin case 30 by engaging the engagement part 2*b* with the engaged parts 37 formed on the outer side surfaces of the second vertical wall parts 33 in the state in which the outer edge part is placed at the upper end parts of the first and second vertical wall parts 32, 33, so that the pressing button 4*a* and the cap rubber 3 are inserted into the opening part 2*a* from the bottom and the flange part 3*a* of the cap rubber 3 is sandwiched. In this way, by covering the released upper part of the resin case 30 in a bottomed rectangular cylindrical shape by using the cover 2, the resin case 30 is closed.

The switch device 1 configured according to the above forms a normally opened type. For example, in the case where a door, etc., is opened, the pressing button 4*a* is installed to a vehicle member via the pair of pins 36 in a mode of being pressed downward. Therefore, when the door, etc., is opened, the pressing button 4*a* is pressed downward, the spring 5 is compressed downward, and, together with this, the movable piece 20 fixed to the fixed contact piece 15 swings forward and contacts the second frame 14, and, as a result, a current flows (or a current value changes) between the first terminal part 11 and the second terminal part 12. Accordingly, that the door, etc., is opened is detected by an ECU, etc.

Meanwhile, when the door, etc., is closed, with the pressing button 4*a* being pressed upward by the biasing force of the spring 5, and the movable piece 20 returning to the original state, the fixed contact piece 15 and the second frame 14 are no longer in contact, and no current flows between the first terminal part 11 and the second terminal part 12 (or the current value changes). Accordingly, that the door, etc., is closed is detected by the ECU, etc.

—Lead Frame—

(*a*) and (*b*) of FIG. 4 are schematic perspective views illustrating the lead frame 10, 10', where (*a*) of FIG. 4 illustrates a state in which a conductive connection part 16 remains, and (*b*) of FIG. 4 illustrates a state in which the conductive connection part 16 is cut off. The lead frame 10 is formed from a conductive plate by performing a punching and pressing process using a mold (not shown). As shown in (*a*) of FIG. 4, the lead frame 10 includes the first terminal part 11, the second terminal part 12, the first frame 13, the second frame 14, and the fixed contact piece 15.

The first terminal part 11 is integrally formed with the lower end part of the first frame 13, and, after extending downward from the lower end part of the first frame 13, a bifurcated portion is bent forward to extend forward with respect to the first frame 13. The first frame 13 is provided with a first installation part 13*a* for installing the resistance element 40 and a second installation part 13*b* for installing the resistance element 42. In addition, a serrated groove 13*c* is formed on the front and back surfaces of a portion between the second installation part 13*b* and the first installation part 13*a* (the portion forming an electrical contact).

The second terminal part 12 is integrally formed with the lower end part of the second frame 14, and, after extending downward from the lower end part of the second frame 14, a bifurcated portion is bent forward to extend forward with respect to the second frame 14. As shown in (*a*) of FIG. 4, the second terminal part 12 and the first terminal part 11, and the second frame 14 and the first frame 13, are respectively formed to be arranged laterally on the same plane. The second frame 14 has a second fixed contact part 18 formed by bending the upper end part forward. While the second frame 14 is orthogonal to the front-rear direction, the second fixed contact part 18 is formed to be orthogonal to the upper-lower direction, thereby reliably contacting a movable contact part 24 of the movable piece 20 to be described afterwards.

In addition, the second frame 14 is provided with a first installation part 14*a* for installing the resistance element 40 and a second installation part 14*b* for installing the resistance element 41. The first installation part 14*a* is paired with the first installation part 13*a* of the first frame 13, and, by installing (mounting) the resistance element 40 to the first installation part 14*a* and the first installation part 13*a*, the first frame 13 and the second frame 14 are electrically connected. In addition, in the second frame 14, a serrated groove 14*c* is formed on the front and back surfaces of a portion between the second fixed contact 18 (the portion forming an electrical contact) and a first' installation part 14*b* and a portion between the first installation part 14*a* (the portion forming an electrical contact) and a first' installation part 14*b*.

The fixed contact piece 15, as shown in (*a*) of FIG. 4, is integrally formed with the first frame 13 via the conductive connection part 16. The fixed contact piece 15 has a first fixed contact part 17 extending upward from the upper end part thereof to form a substantially L shape. In addition, the fixed contact piece 15 has a protrusion part 19 extending downward from the lower end part thereof.

In addition, the fixed contact piece 15 is provided with a first' installation part 15*b* for installing the resistance element 41 and a second installation part 15*a* for installing the resistance element 42. The first' installation part 15*b* is paired with the first' installation part 14*b* of the second frame 14, and, by installing (mounting) the resistance element 41 to the first' installation part 15*b* and the first' installation part 14*b*, the fixed contact piece 15 and the second frame 14 are electrically connected. In addition, the second installation part 15*a* is paired with the second installation part 13*b* of the first frame 13, and, by installing (mounting) the resistance element 42 to the second installation part 15*a* and the second installation part 13*b*, the first frame 13 and the fixed contact piece 15 are electrically connected. In addition, in the fixed contact piece 15, a serrated groove 15*c* is formed on the front and back surfaces of a portion between the first fixed contact part 17 (the portion forming an electrical contact) and the second installation part 15*a* as well as the first' installation part 15*b*.

Here, the movable piece 20 is described. FIG. 5 is a schematic perspective view illustrating a contact structure of the movable piece 20. As shown in FIG. 5, the movable piece 20 has an installation part 21, an arm part 22, an engagement protrusion part 23, and a movable contact part 24. In the installation part 21, a notch part 21*a* is formed and, by sandwiching the first fixed contact part 17 of the fixed contact piece 15 by using the notch part 21*a*, the installation part 21 is installed to the first fixed contact part 17. The arm part 22 extends leftward from the rear end part of the installation part 21. The engagement protrusion part 23 extends forward from the upper end part of the arm part 22 and contacts the sliding part formed on the inner side surface of the guided part 4*e* on the rear side. In the state in which the pressing button 4*a* is not pressed downward, the movable contact part 24 extends forward from the tip end part (the end part on the left side) of the arm part 22 to the vicinity the second fixed contact part 18 of the second frame 14.

By configuring the movable piece 20 as the above, when the pressing button 4*a* is pressed downward against the biasing force of the spring 5, the operator 4 slides downward, and the engagement protrusion part 23 contacting the sliding part is pressed forward. Accordingly, the arm part 22 swings to the forward side, and the movable contact piece 24 stopped in the vicinity the second fixed contact part 18, as shown in FIG. 5, reaches substantially right above the second fixed contact part 18 while sliding to (contacting) the second fixed contact part 18. In this way, with the movable contact part 24 contacting the second fixed contact part 18, the fixed contact part 15 (the first fixed contact part 17) and the second frame 14 (the second fixed contact part 18) are electrically connected via the movable piece 20.

Meanwhile, when the operator 4 slides upward to return to the original state due to the biasing force of the spring 5, the force of the sliding part that pushes the engagement protrusion part 23 forward weakens (the sliding part returns to the state of contacting only the engagement protrusion part 23). Accordingly, with the movable piece 20 returning to the original state, the fixed contact piece 15 (the first fixed contact part 17) and the second frame 14 (the second fixed contact part 18) are not in contact.

As can be understood by comparing (*a*) of FIG. 4 and (*b*) of FIG. 4, the differences between the lead frame 10 and a lead frame 10' lies only in whether the conductive connection part 16 remains (lead frame 10) or the conductive connection part 16 is cut off (lead frame 10'). Therefore, the lead frame 10 and the lead frame 10' can naturally be formed by performing a punching and pressing process and a bending process using the same mold.

In the lead frame 10 configured as the above, as described in the following, it is possible to form multiple electrical circuits with different patterns by combining whether the resistance elements 40, 41, 42 are installed to the respective installation parts 13*a*, 13*b*, 14*a*, 14*b*, 15*a*, 15*b* and whether the conductive connection part 16 is cut off.

—Patterns of Electrical Circuits—

In the following description, the first terminal part 11 and the second terminal part 12 are electrically connected with an external circuit such as ECU, and the first terminal part 11 is supplied with a current of a predetermined intensity so that a current flows from the first terminal part 11 to the second terminal part 12.

(Pattern 1 of Electrical Circuit)

(*a*) and (*b*) of FIG. 6 are schematic views illustrating an example of an electrical circuit not including a resistance element, where (*a*) of FIG. 6 illustrates a perspective view of the lead frame 10, and (*b*) of FIG. 6 illustrates a circuit diagram. As shown in (*a*) of FIG. 6, in the case where the conductive connection part 16 remains (no cutting) and a resistance element is not installed (no installation), an electrical circuit in which a current flows in an order of the first terminal part 11→the first frame 13→the conductive connection part 16→the fixed contact piece 15→(the first fixed contact part 17)→the movable piece 20→(the second fixed contact part 18)→the second frame 14→the second terminal part 12 and a resistance element is not included, as shown in (*b*) of FIG. 6, is formed.

In such case, with the ECU recognizing that the current flows to the second terminal part 12, that the door, etc., is opened is detected, whereas, with the ECU recognizing that the current does not flow to the second terminal part 12, that the door, etc., is closed is detected.

(Pattern 2 of Electrical Circuit)

(*a*) and (*b*) of FIG. 7 are schematic views illustrating an example of a parallel electrical circuit including one resistance element 40, where (*a*) of FIG. 7 illustrates a perspective view of the lead frame 10, and (*b*) of FIG. 7 illustrates a circuit diagram. As shown in (*a*) of FIG. 7, in the case where the conductive connection part 16 remains (no cutting) and the resistance element 40 is installed (with installation) to the first installation parts 13*a*, 14*a*, a parallel electrical circuit in which a current flows in an order of the first terminal part 11→the first frame 13→the conductive connection part 16→the fixed contact piece 15→(the first fixed contact part 17)→the movable piece 20→(the second fixed contact part 18)→the second frame 14→the second terminal part 12 in parallel with a current flowing in an order of the first terminal part 11→the first frame 13→(the first installation part 13*a*)→the resistance element 40→(the first installation part 14*a*)→the second frame 14→the second terminal part 12 and which includes one resistance element 40, as shown in (*b*) of FIG. 7, is formed.

In this case, even if the switch device 1 is OFF, the current flows to the side of the resistance element 40. Therefore, the between-terminal voltage between the first terminal part 11 and the second terminal part 12 becomes a voltage value (e.g. V1) determined by the resistance value of the resistance element 40. Therefore, with the ECU recognizing the voltage value V1 of the between-terminal voltage, that the door, etc., is closed is detected.

Meanwhile, when the switch device 1 is ON, the current also flows to the side of the movable piece 20. Therefore, the between-terminal voltage becomes a voltage value (e.g., V2, V2<V1) determined by the resistance value of the contact resistance of the movable piece 20, etc. Therefore, with the ECU recognizing the voltage value V2 lower than the voltage value V1, that the door, etc., is opened is detected.

Comparatively, in the case where an electrical wire connected with the first terminal part 11 and the second terminal part 12 is disconnected, a current does not flow between the first terminal part 11 and the second terminal part 12. Therefore, with the ECU recognizing that a current does not flow to the second terminal part 12, disconnection is detected.

(Pattern 3 of Electrical Circuit)

(*a*) and (*b*) of FIG. 8 are schematic views illustrating a parallel electrical circuit including one resistance element 41, where (*a*) of FIG. 8 illustrates a perspective view of the lead frame 10, and (*b*) of FIG. 8 illustrates a circuit diagram. As shown in (*a*) of FIG. 8, in the case where the conductive connection part 16 remains (no cutting) and the resistance element 41 is installed (with installation) to the first' installation parts 14*b*, 15*b*, a parallel electrical circuit in which a current flows in an order of the first terminal part 11→the first frame 13→the conductive connection part 16→the fixed contact piece 15→(the first fixed contact part 17)→the movable piece 20→(the second fixed contact part 18)→the second frame 14→the second terminal part 12 in parallel with a current flowing in an order of the first terminal part 11→the first frame 13→the conductive connection part 16→the fixed contact piece 15→(the first' installation part 15*b*)→the resistance element 41→(the first' installation part 14*b*)→the second frame 14→the second terminal part 12 and which includes one resistance element 41, as shown in (b) of FIG. 8, is formed.

In this case as well, like the pattern 2 above, by monitoring the between-terminal voltage between the first terminal part 11 and the second terminal part 12, the opening/closing and the disconnection of the door, etc., are detected.

(Pattern 4 of Electrical Circuit)

(*a*) and (*b*) of FIG. 9 are schematic views illustrating an example of a serial electrical circuit including one resistance element 42, where (*a*) of FIG. 9 illustrates a perspective view of the lead frame 10', and (*b*) of FIG. 9 illustrates a circuit diagram. As shown in (*a*) of FIG. 9, in the case where the conductive connection part 16 is cut off (with cutting) and the resistance element 42 is installed to the second installation parts 13*b*, 15*a*, a serial electrical circuit in which a current flows in an order of the first terminal part 11→the first frame 13→(the second installation part 13*b*)→the resistance element 42→(the second installation part 15*a*)→the fixed contact piece 15→(the first fixed contact part 17)→the movable piece 20→(the second fixed contact part 18)→the second frame 14→the second terminal part 12 and which includes the resistance element 42 as shown in (*b*) of FIG. 9 is formed.

In such case as well, like the pattern 1, with the ECU recognizing that the current flows to the second terminal part 12, that the door, etc., is opened is detected, whereas, with the ECU recognizing that the current does not flow to the second terminal part 12, that the door, etc., is closed is detected.

(Pattern 5 of Electrical Circuit)

(*a*) and (*b*) of FIG. 10 are schematic views illustrating an example of a parallel electrical circuit including two resistance elements 41, 42, where (*a*) of FIG. 10 illustrates a perspective view of a lead frame 10', and (*b*) of FIG. 10 illustrates a circuit diagram. As shown in (*a*) of FIG. 10, in the case where the conductive connection part 16 is cut off (with cutting) and the resistance elements 41, 42 are respectively installed (with installation) to the first' installation parts 14*b*, 15*b* and the second installation parts 13*b*, 15*a*, a parallel electrical circuit in which a current flows in an order of the first terminal part 11→the first frame 13→(the second installation part 13*b*)→the resistance element 42→(the second installation part 15*a*)→the fixed contact piece 15→(the first fixed contact part 17)→the movable piece 20→(the second fixed contact part 18)→the second frame 14→the second terminal part 12 in parallel with a current flowing in an order of the first terminal part 11→the first frame 13→(the second installation part 13*b*)→the resistance element 42→(the second installation part 15*a*)→the fixed contact piece 15→(the first' installation part 15*b*)→the resistance element 41→(the first' installation part 14*b*)→the second frame 14→the second terminal part 12 and which includes the two resistance elements 41, 42 as shown in (*b*) of FIG. 10 is formed.

In this case, even if the switch device 1 is OFF, the current flows to the side of the resistance element 41. Therefore, the between-terminal voltage between the first terminal part 11 and the second terminal part 12 becomes a voltage value (e.g. V1') determined by the resistance values of the resistance element 41 and the resistance element 42. Therefore, with the ECU recognizing the voltage value V1' of the between-terminal voltage, that the door, etc., is closed is detected.

Meanwhile, when the switch device 1 is ON, the current also flows to the side of the movable piece 20. Therefore, the between-terminal voltage becomes a voltage value (e.g., V2', V2'<V1') determined by the resistance values of the contact resistances of the resistance element 42 and the movable piece 20, etc. Therefore, with the ECU recognizing the voltage value V2' lower than the voltage value V1', that the door, etc., is opened is detected.

Comparatively, with the ECU recognizing that a current does not flow to the second terminal part 12, disconnection is detected.

(Pattern 6 of Electrical Circuit)

(*a*) and (*b*) of FIG. 11 are schematic views illustrating an example of a parallel electrical circuit including two resistance elements 40, 42, where (*a*) of FIG. 11 illustrates a perspective view of the lead frame 10', and (*b*) of FIG. 11 illustrates a circuit diagram. As shown in (*a*) of FIG. 11, in the case where the conductive connection part 16 is cut off (with cutting) and the resistance elements 40, 42 are respectively installed (with installation) to the first installation parts 13*a*, 14*a* and the second installation parts 13*b*, 15*a*, a parallel electrical circuit in which a current flows in an order of the first terminal part 11→the first frame 13→(the second installation part 13*b*)→the resistance element 42→(the second installation part 15*a*)→the fixed contact piece 15→(the first fixed contact part 17)→the movable piece 20→(the second fixed contact part 18)→the second frame 14→the second terminal part 12 in parallel with a current flowing in an order of the first terminal part 11→the first frame 13→(the first installation part 13*a*)→the resistance element 40→(the first installation part 14*a*)→the second frame 14→the second terminal part 12 and which includes the two resistance elements 40, 42 as shown in (*b*) of FIG. 11 is formed.

In this case, even if the switch device 1 is OFF, the current flows to the side of the resistance element 40. Therefore, the between-terminal voltage between the first terminal part 11 and the second terminal part 12 becomes a voltage value (e.g. V1") determined by the resistance value of the resistance element 40. Therefore, with the ECU recognizing the voltage value V1" of the between-terminal voltage, that the door, etc., is closed is detected.

Meanwhile, when the switch device 1 is ON, the current also flows to the side of the movable piece 20. Therefore, the between-terminal voltage becomes a voltage value (e.g., V2", V2">V1") determined by the resistance values of the contact resistances of the resistance element 42 and the movable piece 20, etc. Therefore, with the ECU recognizing the voltage value V2" higher than the voltage value V1", that the door, etc., is opened is detected.

Comparatively, with the ECU recognizing that a current does not flow to the second terminal part 12, disconnection is detected.

—Method of Manufacturing a Lead Frame Insert Molded Article—

As described above, in the embodiment, the switch device 1 is assembled by using a lead frame insert molded article 50 (see (*c*) in FIG. 14) in which the lead frame 10, 10' is integrated with the base 31 of the resin case 30 through insert molding. More specifically, in the lead frame insert molded article 50, the lead frame 10, 10' is integrated with the resin case 30 so that the first and second terminal parts 11, 12 are arranged side-by-side laterally to protrude downward (the cylinder axial direction) from the base 31 of the resin case 30 in a bottomed cylindrical shape. In the following, an example of the manufacturing method of such lead frame insert molded article 50 is described.

(*a*) and (*b*) of FIG. 12 are schematic perspective views illustrating an example of a semi-finished article 50' of the lead frame insert molded article 50, where (*a*) of FIG. 12 illustrates a view that is viewed from an oblique upper side, and (*b*) of FIG. 12 illustrates a view that is viewed from an oblique lower side. At the time when the lead frame 10, 10' is integrated with the resin case 30 through insert molding, positioning is generally performed on the side of the first and second terminal parts 11, 12 protruding in the cylinder axial direction from the base 31 after insert molding.

More specifically, as shown in (*b*) of FIG. 12, the first and second terminal parts 11, 12 are formed by a punching and pressing process from a conductive plate in a state of being connected with a frame part 60 in a bathtub shape. As shown in (*a*) and (*b*) of FIG. 12, four pilot holes 63 are formed in the frame part 60. By using such pilot holes 63, the positioning of the lead frame 10, 10' during insert molding is performed. In addition, as shown in (*a*) of FIG. 12, a contact prevention part 61 is formed by bending forward a portion 61' (see (*a*) of FIG. 13) extending side-by-side with the first and second terminal parts 11, 12. By suppressing the contact among articles using such contact prevention part 61, the deformation of a bent part (contact part) is prevented.

However, in such method, in the case where the conductive connection part 16 is cut off, the edge between the first frame 13 and the fixed contact piece 15 is cut off. In other words, there is considered to be a case where it is difficult to position the fixed contact piece 15 because the edge between the frame part 60 having the pilot holes 63 and the fixed contact piece 15 is cut off.

Therefore, in the embodiment, the protrusion part 19 is provided at the fixed contact piece 15. In the protrusion part 19, a tip end part 19*a* extending in the same direction with the first and second terminal parts 11, 12 as shown in (*a*) and (*b*) of FIG. 4 and protruding from the base 31 in a state of being integrated with the resin case 30 as shown in (*b*) of FIG. 12 is integrally formed with the first terminal part 11 and the second terminal part 12 via the connection part 19*b*.

By providing such protrusion part 19 in the fixed contact piece 15, even in the case where the conductive connection part 16 is cut off, the fixed contact piece 15 is connected with the first and second terminal parts 11, 12 via the protrusion part 19. Therefore, by performing positioning on the side of the first and second terminal parts 11, 12 (the four pilot slot holes), the fixed contact piece 15 can be easily positioned.

Moreover, the tip end part 19*a* of the protrusion part 19 integrally formed with the first and second terminal parts 11, 12 via the connection part 19*b* protrudes from the base 31 in the state of being integrated with the resin case 30. Therefore, by cutting off the connection part 19*b* after insert molding, that a current flows between the first terminal part 11 and the second terminal part 12 via the protrusion part 19 can be easily prevented.

(*a*) to (*d*) of FIG. 13 and (*a*) to (*c*) of FIG. 14 are schematic views illustrating a manufacturing method of the lead frame insert molded article 50. The manufacturing method of the lead frame insert molded article 50 of the embodiment, as show in the example of (*a*) to (*d*) of FIG. 13 and (*a*) to (*c*) of FIG. 14, includes a punching and pressing process, a bending and pressing process, a first cutting process, a mounting process, a resin sealing process, a second cutting process, and a third cutting process.

Firstly, as shown in (*a*) of FIG. 13, in the punching and pressing process, the first terminal part 11, the second terminal part 12, the first frame 13, the second frame 14, the fixed contact piece 15 having the protrusion part 19, and the frame part 60 having the portion 61' extending side-by-side with the first and second terminal parts 11, 12 are punched from the conductive plate.

Then, as shown in (*b*) of FIG. 13, in the bending and pressing process, the second fixed contact part 18 on the same plane with the second frame 14 is bent forward to be orthogonal to the upper-lower direction, and the portions 61' are bent forward to form a right angle with the frame part 60, thereby forming a pair of contact prevention parts 61.

Regarding the relationship with the claims, the punching and pressing process and the bending and pressing process of the embodiment are equivalent to a pressing process of forming a lead frame from a conductive plate".

Then, as shown in (*c*) of FIG. 13, in the first cutting process, the conductive connection part 16 connecting the first frame 13 and the fixed contact piece 15 is cut off. In this way, even if the conductive connection part 16 is cut off, the tip end part 19*a* of the protrusion part 19 of the fixed contact piece 15 is integrally formed with the first and second terminal parts 11, 12 via the connection part 19*b*. Therefore, the first frame 13 and the fixed contact piece 15 are maintained in a state of being connected via the protrusion part 19 and the first terminal part 11.

Then, as shown in (d) of FIG. 13, in the mounting process, the resistance elements 40, 42 are mounted to the lead frame 10'. More specifically, like the example of (*a*) and (*b*) of FIG. 11, the resistance element 40 is installed to the first installation parts 13*a*, 14*a*, and the resistance element 42 is installed to the second installation parts 13*b*, 15*a*. At this time, the resistance elements 40, 42 are installed to the first installation parts 13*a*, 14*a* and the second installation parts 13*b*, 15*a* by reflowing, for example, that is, by melting, with heat, cream solder coated on the first installation parts 13*a*, 14*a* and the second installation parts 13*b*, 15*a*.

Then, in the resin sealing process, after the lead frame 10' is positioned by using the four pilot holes 63 of the frame part 60, the resistance elements 40, 42 mounted in the mounting process, together with the first and second frames 13, 14 and the fixed contact piece 15, are sealed with resin by insert molding, and, as shown in (*a*) of FIG. 14, the resin case 30 is molded, so that the tip end part 19*a* of the protrusion part 19 and the first and second terminal parts 11, 12 protrude from the base 31. Accordingly, the semi-finished article 50' is completed. In this way, even in the case where the conductive connection part 16 is cut off, the fixed contact piece 15 is connected with the first and second terminal parts 11, 12 via the protrusion part 19. Therefore, the fixed contact piece 15 can be easily positioned.

Then, as shown in (*b*) of FIG. 14, in the second cutting process, the connection part 19*b* is cut off to separate the tip end part 19*a* of the protrusion part 19 from the first and second terminal parts 11, 12.

In the third cutting process, by separating the first and second terminal parts 11, 12 from the frame part 60, the lead frame insert molded article 50 as shown in (*c*) of FIG. 14 is completed.

—Functions, Effects—

According to the lead frame 10 according to the embodiment, the electrical circuits of different types shown in the patterns 1 to 6 can be configured through the combination of whether the resistance elements 40, 41, 42 are installed to the respective installation parts 13*a*, 13*b*, 14*a*, 14*b*, 15*a*, 15*b* and whether the conductive connection part 16 is cut off.

Moreover, in the case of forming the electrical circuits of different types, since only the installation of the resistance elements 40, 41, 42 and the cutting of the conductive connection part 16 are performed, the electrical circuits of different types can be realized by using the common lead frame 10. Accordingly, it is possible to standardize the design and share the mold, so the cost increase can be suppressed.

In addition, in the case of forming the electrical circuits including the resistance elements 40, 41, 42, the resistance elements 40, 41, 42 are integrated with the resin case 30 through insert molding. Therefore, the concern that the resin case 30 is melt, etc., due to the heat of soldering the resistance elements 40, 41, 42 like the case of installing the resistance elements 40, 41, 42 after insert molding does not arise. Consequently, the assembleability of the switch device can be facilitated. In addition, since the resistance elements 40, 41, 42 are not exposed, the corrosion and deterioration of the electrode parts, etc., in the resistance elements 40, 41, 42 can be suppressed.

In addition, since the serrated grooves 13*c*, 14*c*, 15*c* are formed on the front and back surfaces of the lead frame 10, in the case where cream solder is coated on the respective installation parts 13*a*, 13*b*, 14*a*, 14*b*, 15*a*, 15*b*, the solder hardly crosses over the serrated grooves 13*c*, 14*c*, 15*c* due to the surface tension of the coated solder. Therefore, the cream solder can be suppressed from flowing out. In addition, the adhesion between resin and metal is reinforced by the serrated grooves 13*c*, 14*c*, 15*c*, and the sealing properties can be expected to improve.

Moreover, according to the manufacturing method according to the embodiment, it is easy to manufacture the lead frame insert molded article 50 in which the lead frame 10' able to form electrical circuits of different types is integrated with the resin case 30 while positioning the fixed contact piece 15 even in the case where the conductive connection part 16 is cut off.

Other Embodiments

The invention is not limited to the embodiments and can be embodied in various other forms without departing from its spirit or essential properties.

In the above embodiment, the switch device 1 is configured as a normally opened type. However, the invention is not limited thereto, and the switch device 1 may also be configured as a normally closed type.

Thus, the above-described embodiments are merely examples in all respects and should not be construed in a restrictive manner. Furthermore, all modifications and changes within the equivalent scope of claims are within the scope of the invention.

[Industrial Applicability]

According to the invention, electrical circuits of different types can be realized by using the common lead frame. Therefore, the invention is useful when applied to a lead frame forming an electrical circuit of a switch device and a manufacturing method of a lead frame insert molded article in which a lead frame is integrated with a resin case through insert molding.

What is claimed is:

1. A lead frame, forming an electrical circuit of a switch device and comprising: a first frame and a second frame respectively integrally formed with a first terminal part and a second terminal part connected with an external circuit; and a fixed contact piece, wherein the lead frame switches an electrical connection state through whether the fixed contact piece and the second frame are brought into contact via a movable piece, wherein the fixed contact piece is integrally formed with the first frame via a conductive connection part, at least one of the first frame and the fixed contact piece and the second frame are respectively provided with first installation parts configured for installing resistance elements electrically connecting both of the at least one of the first frame and the fixed contact piece and the second frame thereon, the first frame and the fixed contact piece are respectively provided with second installation parts configured for installing the resistance elements electrically connecting both of the first frame and the fixed contact piece thereon, and through combinations of whether the resistance elements are installed to the respective first and second installation parts and whether the conductive connection part is cut off from the fixed contact piece and the first frame, the lead frame is capable of forming the electrical circuit of the switch device as an electrical circuit not comprising the resistance elements, a serial electrical circuit comprising the resistance elements, or a parallel electrical circuit comprising the resistance elements.

2. The lead frame as claimed in claim 1, wherein in the first frame and the second frame and the fixed contact piece, serrated grooves are formed on front and back surfaces between portions forming electrical contacts and the first installation parts as well as the second installation parts.

3. The lead frame as claimed in claim 1, wherein the first frame and the second frame and the fixed contact piece are integrated with a resin case having a cylindrical side wall and a bottom wall closing one end thereof, by insert molding, so that the first terminal part and the second terminal part protrude side-by-side from a bottom part of the resin case in a cylinder axial direction, the fixed contact piece is provided with a protrusion part extending in the same direction as the first terminal part and the second terminal part, and in the protrusion part, a tip end part protruding from the bottom part is integrally formed with the first terminal part and the second terminal part via a connection part in a state of being integrated with the resin case.

4. The lead frame as claimed in claim 3, wherein in a case of forming the electrical circuit comprising the resistance elements, the resistance elements are integrated with the resin case through insert molding.

5. A manufacturing method of a lead frame insert molded article in which a lead frame is integrated with a resin case having a cylindrical side wall and a bottom wall closing one end thereof, through insert molding, so that a first terminal part and a second terminal part protrude in a cylinder axial direction from a bottom part of the resin case, the lead frame comprising: a first frame, integrally formed with the first terminal part; a second frame, integrally formed with the second terminal part extending in the same direction as the first terminal part; and a fixed contact piece, integrally formed with the first frame via a conductive connection part, and having a protrusion part which extends in the direction same as the first terminal part and the second terminal part and in which a tip end part is integrally formed with the first terminal part and the second terminal part via a connection part, the manufacturing method of the lead frame insert molded article comprising:

a pressing process of forming the lead frame from a conductive plate;

a first cutting process of cutting off the conductive connection part in the lead frame formed in the pressing process;

a mounting process of mounting resistance elements to the lead frame;

a resin sealing process of resin sealing the resistance elements mounted in the mounting process together with the first frame and the second frame and the fixed contact piece by insert molding while positioning the lead frame on a side of the first terminal part and the second terminal part, and molding the resin case so that the first terminal part and the second terminal part and the tip end part of the protrusion part protrude from the bottom part; and a second cutting process of cutting off the conductive connection part to separate the tip end part of the protrusion part from the first terminal part and the second terminal part.

* * * * *